United States Patent
Hassan et al.

(10) Patent No.: US 12,473,048 B2
(45) Date of Patent: Nov. 18, 2025

(54) METHODS, CONTROL UNIT, PERSONAL MOBILE TERMINAL, LIGHTWEIGHT VEHICLE, AND SYSTEM

(71) Applicant: Robert Bosch GmbH, Stuttgart (DE)

(72) Inventors: Khaled Shawky Hassan, Laatzen (DE); Nadia Brahmi, Hildesheim (DE); Andre Schwarzmeier, Reutlingen (DE); Frank Hofmann, Hildesheim (DE); Andreas Schaller, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 53 days.

(21) Appl. No.: 17/996,804

(22) PCT Filed: Sep. 23, 2021

(86) PCT No.: PCT/EP2021/076215
§ 371 (c)(1),
(2) Date: Oct. 21, 2022

(87) PCT Pub. No.: WO2022/083967
PCT Pub. Date: Apr. 28, 2022

(65) Prior Publication Data
US 2023/0182848 A1    Jun. 15, 2023

(30) Foreign Application Priority Data

Oct. 23, 2020    (EP) .................................... 20203632

(51) Int. Cl.
*B62J 45/20* (2020.01)
*B62J 50/21* (2020.01)
(Continued)

(52) U.S. Cl.
CPC ............... *B62J 45/20* (2020.02); *B62J 50/22* (2020.02); *B62J 50/225* (2020.02); *B62K 11/00* (2013.01);
(Continued)

(58) Field of Classification Search
None
See application file for complete search history.

(56) References Cited

U.S. PATENT DOCUMENTS 10,913,511 B2 * 2/2021 Iino ........................... B62M 6/45
11,046,308 B2 * 6/2021 Hehn ..................... G01S 5/0072
(Continued)

FOREIGN PATENT DOCUMENTS

| CN | 202429321 U | 9/2012 |
| CN | 205440664 U | 8/2016 |

(Continued)

OTHER PUBLICATIONS

International Search Report for PCT/EP2021/076215, Issued Dec. 20, 2021.
(Continued)

*Primary Examiner* — Todd Melton
(74) *Attorney, Agent, or Firm* — NORTON ROSE FULBRIGHT US LLP

(57) ABSTRACT

A method for operating a control unit of a light-weight vehicle, especially of a pedal electric cycle or of an electric kick scooter. The method includes: receiving at least one sensor information associated with a sensor of the vehicle; and transmitting, via a communication channel between the control unit and a personal mobile terminal, the at least one sensor information and/or at least an information based thereon.

14 Claims, 2 Drawing Sheets

(51) Int. Cl.
    *B62J 50/22*    (2020.01)
    *B62K 11/00*    (2006.01)
    *H04W 4/48*    (2018.01)
(52) U.S. Cl.
    CPC ........... *H04W 4/48* (2018.02); *B62K 2202/00* (2013.01); *B62K 2204/00* (2013.01)

(56) References Cited

U.S. PATENT DOCUMENTS

| | | | |
|---|---|---|---|
| 11,683,684 B2 * | 6/2023 | Lund | H04W 4/40 726/2 |
| 2010/0198453 A1 | 8/2010 | Dorogusker et al. | |
| 2014/0209400 A1 | 7/2014 | Yao et al. | |
| 2016/0086489 A1 * | 3/2016 | Aich | B60Q 5/006 340/903 |
| 2018/0075750 A1 | 3/2018 | Takamura et al. | |
| 2019/0039611 A1 | 2/2019 | Jian | |
| 2019/0111921 A1 | 4/2019 | Hehn et al. | |

FOREIGN PATENT DOCUMENTS

| | | |
|---|---|---|
| CN | 109969331 A | 7/2019 |
| DE | 202011109723 U1 | 2/2012 |

OTHER PUBLICATIONS

Gao and Peh: "Automotive V2X on Phones," Design, Automation & Test in Europe, EDAA Consortium, (2016), pp. 858-863, XP058279424.

* cited by examiner

METHODS, CONTROL UNIT, PERSONAL MOBILE TERMINAL, LIGHTWEIGHT VEHICLE, AND SYSTEM

FIELD

The description concerns advances in communication and control of lightweight vehicles.

BACKGROUND INFORMATION

According to a first aspect of the present invention, a method for operating a control unit of a light-weight vehicle, especially of a pedal electric cycle or of an electric kick scooter, comprises: receiving at least one sensor information associated with a sensor of the vehicle; and transmitting, via a communication channel between the control unit and a personal mobile terminal, the at least one sensor information and/or at least an information based thereon.

Advantageously, according to an example embodiment of the present invention, the control unit is responsible for transmitting the at least one sensor information towards the personal mobile terminal. Therefore, further calculation units can be omitted on the side of the control unit and the responsibility for processing the at least one sensor information and/or the at least one information based thereon is shifted to the personal mobile terminal. Moreover, a radio interface for V2X communication can be omitted on the side of the control unit. A cheaper control unit is provided.

According to an advantageous example embodiment of the present invention, the method comprises: receiving, via the communication channel between the control unit and the personal mobile terminal, at least one reaction information for the vehicle; and operating the vehicle based on the received at least one reaction information.

Advantageously, the determination of the reaction information is shifted from the control unit to the personal mobile terminal.

According to an advantageous example embodiment of the present invention, the method comprises: receiving, via the communication channel between the control unit and the personal mobile terminal, the at least one status information associated with the personal mobile terminal; and wherein the transmitting, via the communication channel between the control unit and the personal mobile terminal, of the at least one sensor information and/or at least an information based thereon is based on the at least one status information.

V2X messages do not only represents a status information, there is also aligning messages. In this case it is an interactive messages and carries commands as well. Let us define state information to:

Any state information represents by (shared) sensor information between the vehicles Any trajectory/paths/waypoints transmitted between the vehicles Further notifications Further relayed information Any alignment information including commands and notification Via the received status information, the control unit is enabled to stop and to start the transmission of the at least one sensor information based on the status of the personal mobile terminal. For example, if the personal mobile terminal signals via the at least one status information, that the radio interface of the personal mobile terminal for V2X communication is disabled, then the control unit may decide to cease transmission of the at least one sensor information.

According to an advantageous example embodiment of the present invention, the method comprises: transmitting, via the communication channel between the control unit of the vehicle and the personal mobile terminal, at least one capability information associated with the vehicle.

Advantageously, the at least one capability information allows the personal mobile terminal to adapt its functions to the capabilities of the vehicle.

According to a second aspect of the present invention, a method for operating a personal mobile terminal comprises: receiving, via a communication channel between the personal mobile terminal and a control unit of a vehicle, at least one sensor information associated with a sensor of the vehicle and/or at least one information based thereon; determining at least one status information associated with the vehicle based on the received at least one sensor information; transmitting, via a radio channel, at least one message, especially a V2X message or a VRU message, comprising the determined at least one status information associated with the vehicle.

Advantageously, the personal mobile terminal is used to enable V2X communication for the vehicle.

According to an advantageous example embodiment of the present invention, the method comprises: receiving, via the radio channel, at least one further message, especially a V2X message, comprising at least one status information associated with a further vehicle; determining at least one reaction information for the vehicle based on the received at least one status information associated with the further vehicle; and transmitting, via the communication channel between the personal mobile terminal and the control unit of the vehicle, the at least one determined reaction information.

Advantageously, the processing capacity of the personal mobile terminal is used to determine the reaction information for the vehicle. Therefore, the control unit can be equipped with a reduced processing capacity.

According to an advantageous example embodiment of the present invention, the method comprises: determine or receive environment information associated with the personal mobile terminal; and wherein the determining of the at least one reaction information is based on the received at least one status information of another vehicle and is based on the determined or received environment information.

By taking into account the environment information, the reaction information can be adapted to the environment the operated vehicle resides in. For example, bad weather conditions indicate a longer braking distance for emergency braking, and therefore, the brakes of the vehicle have to be operated accordingly.

According to an advantageous example embodiment of the present invention, the method comprises: determining at least one status information associated with the personal mobile terminal; and transmitting, via the communication channel between the at least one status information associated with the personal mobile terminal.

For example, if the personal mobile terminal indicates a low battery status, then the control unit may initiate a shutdown of its V2X services or parts thereof.

According to an advantageous example embodiment of the present invention, the method comprises: receiving, via the communication channel between the personal mobile terminal and the control unit of the vehicle, a capability information associated with the vehicle; and wherein the determining of the at least one reaction information for the vehicle is based on the received at least one status information associated with the further vehicle and on the received capability information.

Advantageously, the determination of the at least one reaction information is made according with the at least one received capability, the vehicle provides for conduction the actual reaction.

According to a third aspect of the present invention, a control unit of a vehicle, especially of a pedal electric cycle or of an electric kick scooter, comprises: receiving means (i.e., receiver) to receive at least one sensor information associated with a sensor of the vehicle; and transmitting means (i.e., transmitter) to transmit, via a communication channel between the control unit and a personal mobile terminal, the at least one sensor information and/or at least an information based thereon.

According to a fourth aspect of the present invention, a vehicle, especially a pedal electric cycle or an electric kick scooter, comprises the control unit according to the preceding aspect.

According to a fifth aspect of the present invention, a personal mobile terminal comprises: receiving means (i.e., receiver) to receive, via a communication channel between the personal mobile terminal and a control unit of a vehicle, at least one sensor information associated with a sensor of the vehicle and/or at least one information based thereon; determining means (i.e., determination device) to determine at least one status information associated with the vehicle based on the received at least one sensor information; transmitting means (i.e., transmitter) to transmit, via a radio channel, at least one message, especially a V2X message, comprising the determined at least one status information associated with the vehicle.

According to a sixth aspect of the present invention, a system comprises the control unit according to the third aspect and the personal mobile terminal according to the fifth aspect.

DETAILED DESCRIPTION OF EXAMPLE EMBODIMENTS

Figure 1:
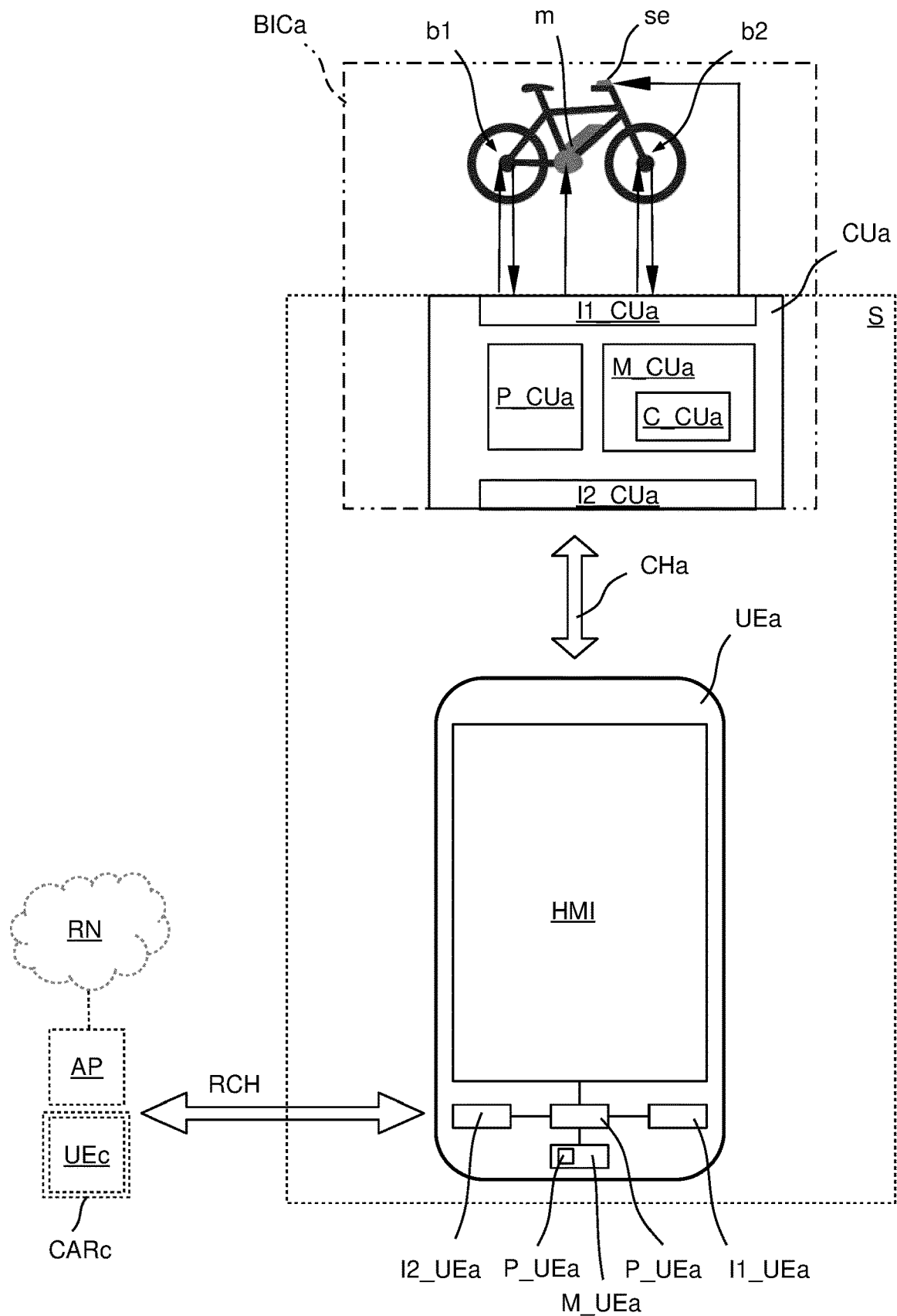
FIG. 1 depicts schematically a block diagram, according to an example embodiment of the present invention.

FIG. 1 depicts schematically a block diagram. A lightweight vehicle BICa is depicted as a pedal electric bicycle and comprises at least one actuator, at least one sensor, and a control unit CUa. For example, the lightweight vehicle BICa does not exceed 50 kg. The at least one actuator comprises at least one of the following: a brake b1, b2, a motor, and a signalizing entity se. The respective actuator provides at least one of the following functions: brake assistance, motor speed regulation, motor disengaging, alarm light, etc.

The at least one sensor comprises at least one of the following: a sensor for sensing a state of one of the brakes b1, b2; a sensor for sensing a motor state of the motor m, a sensor indicating an operating condition of an external lighting. Accordingly, sensor information may include information from at least one of the following sources: light sensors, brake sensors (e.g., gyro (inertia)-sensor or electronic ABS device or a brake-lever switch/clutch), acceleration sensor, speed sensor, right/left turning sign/axis sensor, battery level sensor, motor vital information sensors.

The control unit CUa comprises a first interface I1_CUa for receiving signals from the at least one sensor and for transmitting at least one operating instruction to the at least one actuator.

The control unit CUa comprises a second interface I2_CUa for communicating via a channel Cha with a personal mobile terminal UEa.

The control unit CUa comprises a memory unit M_CUa, and a processing unit P_CUa. On the non-transitory memory unit M_CUa, a computer program C_CUa is stored. When executing the computer program C_CUa on the processing unit P_CUa, the processing unit P_CUa causes, together with the memory unit M_CUa, and the interfaces I1_CUa and I2_CUa, the control unit CUa to conduct the methods described herein.

The personal mobile terminal UEa comprises a first interface I1_UEa to communicate via the channel CHa with the control unit CUa.

The personal mobile terminal UEa comprises a second interface I2_UEa to communicate via a radio channel RCH with a further radio terminal UEc of another vehicle CARc and/or with a roadside unit (RSU) and/or an access point AP like a base-station (e.g. a gNB or an eNB) to communicate with a backhaul entity. Additionally, another third interface I2_UEa communicating to another communication entity in a remote network RN or in a Radio Access Network (RAN), e.g., a base station (gNB or eNB). The radio channel RCH 1 can be one of the following: a direct communication channel to a mobile terminal UEc of another vehicle CARc or a Roadside unit. The radio channel RCH 2 can be one of the following: an uplink or downlink channel to/from the access point AP or a base-station.

The personal mobile terminal UEa comprises a non-transitory memory unit M_UEa, a human machine interface HMI in form of a touch panel, and a processing unit P_UEa. On the memory unit M_UEa, a computer program C_UEa is stored. When executing the computer program C_UEa on the processing unit P_UEa, the processing unit P_UEa causes, together with the memory unit M_UEa, and the interfaces I1_UEa and I2_UEa, the personal mobile terminal UEa to conduct the methods described herein.

The personal mobile terminal UEa is adapted to transmit and receive V2X messages (V2X: Vehicle to everything) and/or to transmit and receive VRU messages (VRU: Vulnerable Road User).

The personal mobile terminal UEa is adapted to transmit and receive V2X service messages (V2X: Vehicle to everything) and/or to transmit and receive VRU service messages (VRU: Vulnerable Road User) to the radio access network (RAN) via Uu interface.

Figure 2:
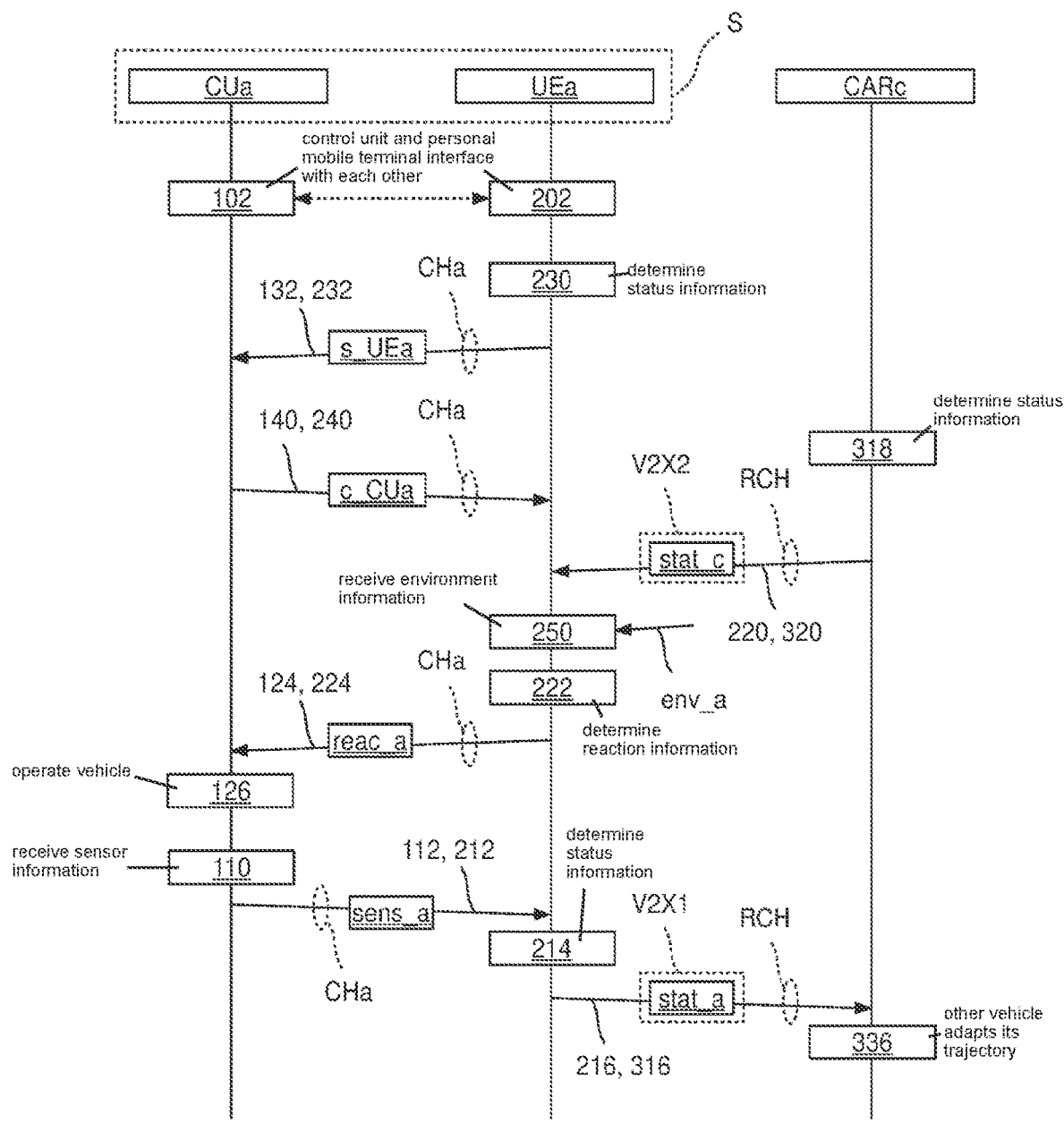
FIG. 2 depicts schematically a sequence diagram, according to an example embodiment of the present invention.

FIG. 2 depicts schematically a sequence diagram. By way of example, the vehicle associated with the control unit CUa is a bicycle and the other vehicle is a car. Of course, the other vehicle can be another bicycle. In another example, the bicycle communicates with a pedestrian-type user terminal.

According to steps 102 and 202, the control unit CUa and the personal mobile terminal UEa interface with each other to provide the communication channel CHa. The personal mobile terminal UEa (e.g., smart phone, tablet) runs an application such that the personal mobile terminal UEa is able to communicate via the communication channel CHA with the control unit CUa. The radio channel CHa has one of the following connectivity options:

Cable, when cable is connected to, e.g., charge the smart device

Near field communication (NFC): exchanging security information, association, and exchange control data, sensor information, and instructions Bluetooth: pairing with the CUa and exchanging data and control Wi-Fi (existing versions or advanced low-power version): used for association and/or sending/exchanging data.

sidelink (D2D) communication on licensed and unlicensed bands

To have a secure connection via communication channel CHa, in order to avoid un-authorized access, an authentication between the CUa and the UEa is conducted. Both a security guard and functional-safety functionalities are implemented in CUa and UEa. Authentication is done between the CUa and the UEa, such that the UEa is able to associate with the CUa via:

a standardized key exchange/sharing, or a secure authentication mechanism running on the on-board device and the smart device application, e.g., the chipset of the CCU-like lower layer part has it so do the application (e.g., a vendor based app and CCU-like chipset)

a legalized e-Mobility ID programmed according licensing the e-Mobility, where the unique Key can associate with the Application (on the smart device UEa) running V2X services.

The further vehicle CARc determines 318 at least one status information stat_c associated with the further vehicle CARc. The status information stat_c comprises, for example, a planned trajectory of the further vehicle CARc. The further vehicle CARc transmits 320 the status information stat_c via the radio channel.

The personal mobile terminal UEa receives (according to receiving means (i.e., receiver) 220), via the radio channel RCH, at least one further message V2X2, especially a V2X message, comprising at least one status information stat_c associated with a further vehicle CARc.

The personal mobile terminal UEa determines (according to determining means (i.e., determination device) 222) at least one reaction information reac_a for the vehicle BICa based on the received at least one status information stat_c associated with the further vehicle CARc.

For example, the determining 222 comprises a comparison of a planned trajectory of the vehicle BICa with a received planned trajectory of the further vehicle, the received trajectory being part of the received status information stat_c.

The personal mobile terminal UEa determines or receives (according to determining or receiving means (i.e., determination or receiving device) 250) environment information env_a associated with the personal mobile terminal UEa. The determining 222 of the at least one reaction information reac_a is based on the received at least one status information stat_c of another vehicle CARc and is based on the determined or received environment information env_a.

The environment information env_a comprises, for example, at least one of the following: a weather condition received via a respective service, a position information received from a location sensor of the personal mobile terminal UEa, a temperature received from a sensor of the personal mobile terminal UEa, etc.

The personal mobile terminal UEa transmits (according to transmitting means (i.e., transmitter) 224), via the communication channel CHa between the personal mobile terminal UEa and the control unit CUa of the vehicle BICa, the at least one determined reaction information reac_a.

The control unit CUa receives (according to receiving means (i.e., receiver) 110) at least one sensor information sens_a associated with one of the sensors of the vehicle BICa.

The control unit CUa transmits (according to transmitting means (i.e., transmitter) 112), via the communication channel CHa between the control unit CUa and the personal mobile terminal UEa, the at least one sensor information sens_a and/or at least an information based thereon.

The personal mobile terminal UEa receives (according to receiving means (i.e., receiver) 212), via the communication channel CHa between the personal mobile terminal UEa and the control unit CUa of the vehicle BICa, the at least one sensor information sens_a associated with a sensor of the vehicle BICa and/or at least one information based thereon.

The personal mobile terminal UEa determines (according to determining or processing means (i.e., determination or processor device) 214) at least one status information stat_a associated with the vehicle BICa based on the received at least one sensor information sens_a.

The personal mobile terminal UEa transmits (according to transmitting means (i.e., transmitter) 216), via a radio channel RCH, at least one message V2X1, especially a V2X message, comprising the determined at least one status information stat_a associated with the vehicle BICa.

According to an example, the personal mobile terminal UEa transmits (according to transmitting means (i.e., transmitter) 216), via a further radio channel that is different from the radio channel RCH, at least one message V2X1, especially a V2X message, comprising the determined at least one status information stat_a associated with the vehicle BICa.

The status information stat_a comprises: time, position, motion state, activated systems, etc.

After receiving 316 the status information stat_a from the personal mobile terminal UEa, the other vehicle CARC adapts 336 its trajectory accordingly.

According to another example, the personal mobile terminal UEa determines (according to the determining means 214) a trajectory of the vehicle BICa based on the received sensor information sens_a.

According to an example, status information stat_a comprises the determined planned trajectory of the vehicle BICa. The personal mobile terminal UEa determines (according to the determining means 214) the trajectory of the vehicle BICa based on the received sensor information sens_a, compares the determined trajectory with the trajectory received via the status information stat_c. In dependence on the comparison, the trajectory is transmitted as the status information stat_a or a reaction (for transmitting the reaction to the control unit CUa) is determined by the personal mobile terminal UEa.

The control unit CUa receives (according to receiving means (i.e., receiver) 124), via the communication channel CHa between the control unit CUa and the personal mobile terminal UEa, at least one reaction information reac_a for the vehicle BICa.

The control unit CUa operates (according to operating means 126) the vehicle BICa based on the received at least one reaction information reac_a.

The reaction information reac_a comprises at least one of the following: activating or deactivating a braking assisting function, activating or deactivating a warning indicator, activating or deactivating a motor acceleration.

The control unit CUa receives (according to receiving means (i.e., receiver) 132), via the communication channel Cha between the control unit CUa and the personal mobile terminal UEa, the at least one status information s_UEa associated with the personal mobile terminal UEa. The transmitting (according to transmitting means (i.e., transmitter) 112), via the communication channel CHa between the control unit CUa and the personal mobile terminal UEa, of the at least one sensor information sens_a and/or at least an information based thereon is based on the at least one status information s_UEa.

For example, the status information s_UEa comprises an upper layer application status like ready, paused, initiating, etc. According to another example, the status information s_UEa comprises a battery status of the personal mobile terminal UEa. According to another example, the status information s_UEa comprises a connectivity status like a sidelink connectivity status, a network connectivity status, etc.

According to an example, the transmitting 112 is conducted, if the status information s_UEa permits the transmission. For example, if the connectivity status of the personal mobile terminal UEa indicates that no connection to another radio entity is available, then the transmission of the sensor information sens_a is ceased and/or listening to receive the reaction information reac_a is disabled.

According to an example, the frequency of the transmitting 112 is reduced, if the status information s_UEa indicates a low battery status of the personal radio terminal UEa. The frequency of the transmitting 112 is increased, if the status information s_UEa indicates a high battery status of the personal radio terminal UEa.

The control unit CUa transmit (according to transmitting means (i.e., transmitter) 140), via the communication channel CHa between the control unit CUa of the vehicle BICa and the personal mobile terminal UEa, at least one capability information c_CUa associated with the vehicle BICa.

The capability information c_CUa indicates, for example, which functionalities like an electronic braking system (EBS), anti-lock braking system, warning signaling entities, brake types, motor types, etc. are available at the vehicle. Based on the capability information c_CUa, the personal mobile terminal UEa is capable to attend a variety of differently configured types of vehicles.

The personal mobile terminal UEa determines (according to determining means (i.e., determination device) 230) at least one status information s_UEa associated with the personal mobile terminal UEa.

The personal mobile terminal UEa transmits (according to transmitting means (i.e., transmitter) 232), via the communication channel Cha between the at least one status information s_UEa associated with the personal mobile terminal UEa.

The personal mobile terminal UEa receives (according to receiving means (i.e., receiver) 240), via the communication channel CHa between the personal mobile terminal UEa and the control unit CUa of the vehicle BICa, a capability information c_CUa associated with the vehicle BICa. The determining 222 of the at least one reaction information reac_a for the vehicle BICa is based on the received at least one status information stat_c associated with the further vehicle CARc and on the received capability information c_CUa.

The determined reaction information reac_a may include disengaging the motor, actuating the brake, or signaling a collision alarm to the driver, if a collision risk was determined via the determining 222.

A system S comprises the control unit CUa and the personal mobile terminal UEa.

In the following, we will introduce in details the proposed solutions for upper-layer split, which comprises: 1st an application running on UEa, the application is able to generate messages associated with the vulnerable road user (VRU) services. Then, 2nd VRU services is sent via the communication protocol stack of UEa either to the network or directly to other users. Hence, the software application together with the hardware of UEa establish CCU functionality and perform V2X-like or VRU-eMobility-type services.

For VRU services (generated/handled by the said application) to access the protocol stack and, later, access the communication channel, said application associates with the UEa (e.g., smart phone) communication modules/protocol stack. In this case, the application securely accesses the radio interface/a modem of UEa, allowing access to both Uu (link to the network) communication link and sidelink communication link. In addition, the application may be configured (offline) or pre-configured (by the network) to access the unlicensed/dedicated spectrum and/or licensed bands for Uu/sidelink for V2X/VRU/sidelink communication. Accordingly, the application also receives VRU and V2X messages from the network and/or other users. The communication is initialized with the application that has the right authorization in order to:

Authenticate with communication modules on UEa;
Compile and send VRU/V2X-like messages;
Authenticate the communication protocol stack to communicate to licensed or unlicensed/dedicated band;
Control the communication protocol stack identifying the right category or class of UE for a certain purpose, e.g., VRU-pedestrian, VRU-eBike type, V2X-eLM, etc.;
Indicate the power category for lower layers;
Access the V2X and/or VRU (with different types) services protocol;
Send measurement report, mobility condition (speed, acceleration, . . . ) and localization information over Uu and/or sidelink transmission.

The application of UEa is also capable of associating with CUa using the secure communication channel CHa, which could be a communication via a secure near-field communication (NFC), Bluetooth communication, other secure wireless communication. However, the application of UEa may associate with CUa using the charging cable (or any other cable) connecting the communication port of UEa to the control-board/lower-layer split of CUa. In order to guarantee secure communication (i.e., to be able to send V2X-like messages or eLM VRU messages), the following may be considered:

The secure channel may be using a secure module regulated by the authority, a secure module regulated by a registered identifier, etc.
The application of UEa may use a vendor based secure association, i.e., the mobile application and the e-mobility chipset is from the same vendor.
The application may use a secure standardized key sharing The application shall securely collect information from the available sensors via the CUa. Additionally, the application shall be able to collect information from the UEa, e.g., location/positioning information, navigation paths, weather conditions, etc. Furthermore, the application shall be able to collect information as received from other road partners, e.g., vehicles, pedestrian, other eLM, including their vulnerable road users awareness messages (VAM), cooperative awareness messages (CAM), cooperative perception messages (CPM), etc.

Based on the information collected from the sensors, information collected from the smart-device sensors, and/or information collected from cooperative awareness/perception messages (e.g., VAM, CAM2 CPM-Like, etc.), the application of UEa instructs, via CUa, the actuators of the vehicle BICa, which are connected to CUa, to perform one or more assisting riding, e.g.:

Assist ABS brakes;
Assist lights/warning; and
Assist motor acceleration/de-acceleration.

The smart phone is connected to the CUa with one or more options, i.e., either wireless or wireline. The personal terminal UEa running the application can have multiple battery status, e.g., charging-high, charging-low, not charging low, not charging-high, etc. The status of UEa includes at least one of the following: battery status, connectivity status (network, sidelink, or both, etc.). The capability information of the CUa comprises at least one of the following: speed monitor, speed control, brakes status, gyro-sensor, or electronic assisted ABS functionality, etc.

The invention claimed is:

1. A method for operating a control unit of a vehicle, comprising the following steps:
    receiving at least one sensor information associated with a sensor of the vehicle;
    transmitting, via a communication channel between the control unit and a personal mobile terminal, the at least one sensor information and/or at least an information based on the at least one sensor information;
    receiving, via the communication channel between the control unit and the personal mobile terminal, at least one status information associated with the personal mobile terminal; and
    wherein the transmitting, via the communication channel between the control unit and the personal mobile terminal, of the at least one sensor information and/or the least the information based on the at least one sensor information, is based on the at least one status information.

2. The method as recited in claim 1, wherein the vehicle is a pedal electric cycle or an electric kick scooter.

3. The method according to claim 1, further comprising the following steps:
    receiving, via the communication channel between the control unit and the personal mobile terminal, at least one reaction information for the vehicle; and
    operating the vehicle based on the received at least one reaction information.

4. The method according to claim 1, further comprising:
    transmitting, via the communication channel between the control unit of the vehicle and the personal mobile terminal, at least one capability information associated with the vehicle.

5. A method for operating a personal mobile terminal, comprising the following steps:
    receiving, via a communication channel between the personal mobile terminal and a control unit of a vehicle, at least one sensor information associated with a sensor of the vehicle and/or at least one information based on the at least one sensor information;
    determining at least one status information associated with the vehicle based on the received at least one sensor information;
    transmitting, via a radio channel and by the personal mobile terminal, at least one message including the determined at least one status information associated with the vehicle.

6. The method according to claim 5, wherein the message is a V2X message or a VRU message.

7. The method according to claim 5, further comprising:
    receiving, via the radio channel, at least one further message including at least one status information associated with a further vehicle;
    determining at least one reaction information for the vehicle based on the received at least one status information associated with the further vehicle; and
    transmitting, via the communication channel between the personal mobile terminal and the control unit of the vehicle, the at least one determined reaction information.

8. The method according to claim 7, further comprising:
    determining or receiving environment information associated with the personal mobile terminal;
    wherein the determining of the at least one reaction information is based on the received at least one status information of the further vehicle and is based on the determined or received environment information.

9. The method according to claim 7, further comprising:
    receiving, via the communication channel between the personal mobile terminal and the control unit of the vehicle, a capability information associated with the vehicle; and
    wherein the determining of the at least one reaction information for the vehicle is based on the received at least one status information associated with the further vehicle and on the received capability information.

10. The method according to claim 5, further comprising:
    determining at least one status information associated with the personal mobile terminal; and
    transmitting, via the communication channel between the personal mobile terminal and the control unit of the vehicle, the at least one status information associated with the personal mobile terminal.

11. A control unit of a vehicle, comprising:
    a receiver configured to receive at least one sensor information associated with a sensor of the vehicle; and
    a transmitter configured to transmit, via a communication channel between the control unit and a personal mobile terminal, the at least one sensor information and/or at least an information based on the at least one sensor information;
    wherein the receiver receives, via the communication channel between the control unit and the personal mobile terminal, at least one status information associated with the personal mobile terminal; and
    wherein the transmitter transmits, via the communication channel between the control unit and the personal mobile terminal, of the at least one sensor information and/or the least the information based on the at least one sensor information, is based on the at least one status information.

12. A vehicle, comprising:
    a control unit including:
        a receiver configured to receive at least one sensor information associated with a sensor of the vehicle; and
        a transmitter configured to transmit, via a communication channel between the control unit and a personal mobile terminal, the at least one sensor information and/or at least an information based on the at least one sensor information;
        wherein the receiver receives, via the communication channel between the control unit and the personal mobile terminal, at least one status information associated with the personal mobile terminal; and wherein the transmitter transmits, via the communication channel between the control unit and the personal mobile terminal, of the at least one sensor information and/or the least the information based on the at least one sensor information, is based on the at least one status information.

13. A personal mobile terminal, comprising:

a receiver configured to receive, via a communication channel between the personal mobile terminal and a control unit of a vehicle, at least one sensor information associated with a sensor of the vehicle and/or at least one information based on the at least one sensor information;

a determination device configured to determine at least one status information associated with the vehicle based on the received at least one sensor information; and a transmitter configured to transmit from the personal mobile terminal, via a radio channel, at least one message, including the determined at least one status information associated with the vehicle.

14. A system, comprising
a control unit of a vehicle including:

a receiver configured to receive at least one sensor information associated with a sensor of the vehicle, and a transmitter configured to transmit, via a communication channel between the control unit and a personal mobile terminal, the at least one sensor information and/or at least an information based on the at least one sensor information; and the personal mobile terminal, including:

a receiver configured to receive, via a communication channel between the personal mobile terminal and the control unit of the vehicle, the at least one sensor information associated with the sensor of the vehicle and/or the at least one information based on the at least one sensor information, a determination device configured to determine at least one status information associated with the vehicle based on the received at least one sensor information, and a transmitter configured to transmit, via a radio channel and by the personal mobile terminal, at least one message, including the determined at least one status information associated with the vehicle.

* * * * *